(12) United States Patent
Hartlage

(10) Patent No.: US 11,397,700 B2
(45) Date of Patent: Jul. 26, 2022

(54) APPLIANCE WITH SERIAL PERIPHERAL INTERFACE MONITOR FOR INTER-INTEGRATED CIRCUIT BUS

(71) Applicant: Haier US Appliance Solutions, Inc., Wilmington, DE (US)

(72) Inventor: Ryan Michael Hartlage, Crestwood, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/063,818

(22) Filed: Oct. 6, 2020

(65) Prior Publication Data

US 2022/0107913 A1    Apr. 7, 2022

(51) Int. Cl.
*G06F 13/14* (2006.01)
*G06F 13/42* (2006.01)

(52) U.S. Cl.
CPC .. *G06F 13/4282* (2013.01); *G06F 2213/0016* (2013.01)

(58) Field of Classification Search
CPC .................................................. G06F 13/4282
See application file for complete search history.

(56) References Cited

U.S. PATENT DOCUMENTS

| | | | |
|---|---|---|---|
| 2,858,619 A * | 11/1958 | Hughes | D06F 34/08 34/546 |
| 6,253,268 B1 | 6/2001 | Bjorkengren | |
| 6,812,433 B1 * | 11/2004 | Barritt | F24C 15/325 219/412 |
| 6,874,052 B1 | 3/2005 | Delmonico | |
| 10,579,572 B2 | 3/2020 | Arias | |
| 2010/0185896 A1 * | 7/2010 | Andres | G06F 11/2005 714/5.11 |
| 2014/0267108 A1 * | 9/2014 | Chung | G06F 3/041661 345/173 |
| 2016/0320068 A1 * | 11/2016 | Koehler | F24C 7/086 |
| 2017/0186079 A1 * | 6/2017 | Kim | G06F 3/0488 |
| 2018/0284938 A1 * | 10/2018 | Montero | G06F 1/3262 |

OTHER PUBLICATIONS

Satoshi, I2C monitor sequential read data storage device (WO2010097831), Sep. 2010, WIPO, pp. 1-64 (Year: 2010).*

* cited by examiner

*Primary Examiner* — Henry Tsai
*Assistant Examiner* — Dean Phan
(74) *Attorney, Agent, or Firm* — Dority & Manning, P.A.

(57) ABSTRACT

A domestic appliance includes a heating element, a user interface for receiving user input, and a main controller. The main controller is in operative communication with the user interface via a touchscreen controller. The main controller is also in operative communication with the heating element. The user interface is in operative communication with the heating element via the touchscreen controller and the main controller. The user interface is in operative communication with the touchscreen controller via an inter-integrated circuit bus. The domestic appliance also includes a serial peripheral interface monitor in operative communication with the inter-integrated circuit bus. The appliance may be configured for, and related methods may include, receiving and monitoring, by the serial peripheral interface monitor, communication between the user interface and the touchscreen controller over the inter-integrated circuit bus.

20 Claims, 9 Drawing Sheets

| SPI BITSTREAM | 0 | 1 | 0 | 0 | 1 | 0 | 1 | 1 | 1 | 0 | 1 | 0 | 0 | 0 | 0 | 1 | 0 | 1 | 0 |
|---|---|---|---|---|---|---|---|---|---|---|---|---|---|---|---|---|---|---|---|
| FINGERPRINT | X | X | X | X | X | X | X | X | 0 | X | X | X | X | X | X | X | 1 | X |

FIG. 7

APPLIANCE WITH SERIAL PERIPHERAL INTERFACE MONITOR FOR INTER-INTEGRATED CIRCUIT BUS

FIELD OF THE INVENTION

The subject matter of the present disclosure relates generally to a user interface for an appliance, such as an oven appliance or a laundry appliance. In particular, the present disclosure relates to an appliance having a user interface in communication with a controller via an inter-integrated circuit bus and a serial peripheral interface monitor for the inter-integrated circuit bus.

BACKGROUND OF THE INVENTION

Domestic appliances are utilized for a variety of domestic tasks such as cooking food, drying laundry, or other similar household or personal tasks. Such tasks often include the application of heat. For example, a heat-using domestic appliance may be an oven appliance or a laundry appliance, such as a dryer, or other household appliance.

Oven appliances generally include a cabinet that defines a cooking chamber for cooking food items therein, such as by baking or broiling the food items. To heat the cooking chamber for cooking, oven appliances include one or more heating elements positioned at a top portion, a bottom portion, or both the top portion and the bottom portion of the cooking chamber. The heating element or elements may be used for various cycles of the oven appliance, such as a preheat cycle, a cooking cycle, or a self-cleaning cycle.

Laundry appliances, such as dryer appliances which are sometimes also referred to as clothes dryers, conventionally include a cabinet having a rotating drum for tumbling clothes and laundry articles therein. One or more heating elements, for example electric heating elements, heat air prior to the air entering the drum, and the warm air is circulated through the drum as the clothes are tumbled to remove moisture from laundry articles in the drum.

Such domestic appliances which generate heat, e.g., appliances which include one or more heating elements, may have undesirable effects when operated improperly and/or inadvertently. Therefore, some such domestic appliances include an interlock on the user interface to prevent or limit unintentional or unauthorized activation of the appliance. However, when the user interface includes a touch interface, such as a touchscreen, which communicates with a controller via an inter-integrated circuit bus, implementing the controls for the interlock on the inter-integrated circuit bus typically involves specialized hardware. The specialized hardware adds increased expense and complexity to the appliance.

Accordingly, a domestic appliance with improved features for monitoring an inter-integrated circuit bus would be desirable.

BRIEF DESCRIPTION OF THE INVENTION

Aspects and advantages of the invention will be set forth in part in the following description, may be apparent from the description, or may be learned through practice of the invention.

In one exemplary embodiment, a domestic appliance is provided. The appliance includes a heating element, a user interface for receiving user input, and a main controller. The main controller is in operative communication with the user interface via a touchscreen controller. The main controller is also in operative communication with the heating element. The user interface is in operative communication with the heating element via the touchscreen controller and the main controller. The user interface is in operative communication with the touchscreen controller via an inter-integrated circuit bus. The domestic appliance also includes a serial peripheral interface monitor in operative communication with the inter-integrated circuit bus. The serial peripheral interface monitor is configured to receive and monitor communication between the user interface and the controller.

In another exemplary embodiment, a method of monitoring an inter-integrated circuit bus in a domestic appliance is provided. The domestic appliance includes a heating element, a user interface for receiving user input, and a main controller. The main controller is in operative communication with the user interface via a touchscreen controller. The main controller is also in operative communication with the heating element. The user interface is in operative communication with the heating element via the touchscreen controller and the main controller. The user interface is in operative communication with the touchscreen controller via the inter-integrated circuit bus. The domestic appliance also includes a serial peripheral interface monitor in operative communication with the inter-integrated circuit bus. The method includes monitoring, by the touchscreen controller via the inter-integrated circuit bus, the user interface for user input. The method also includes receiving and monitoring, by the serial peripheral interface monitor, communication between the user interface and the touchscreen controller.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 7 provides a table illustrating comparison of an SPI bitstream against a fingerprint of an I2C bitstream according to one or more additional embodiments of the present subject matter.

DETAILED DESCRIPTION OF THE INVENTION

Figure 1:
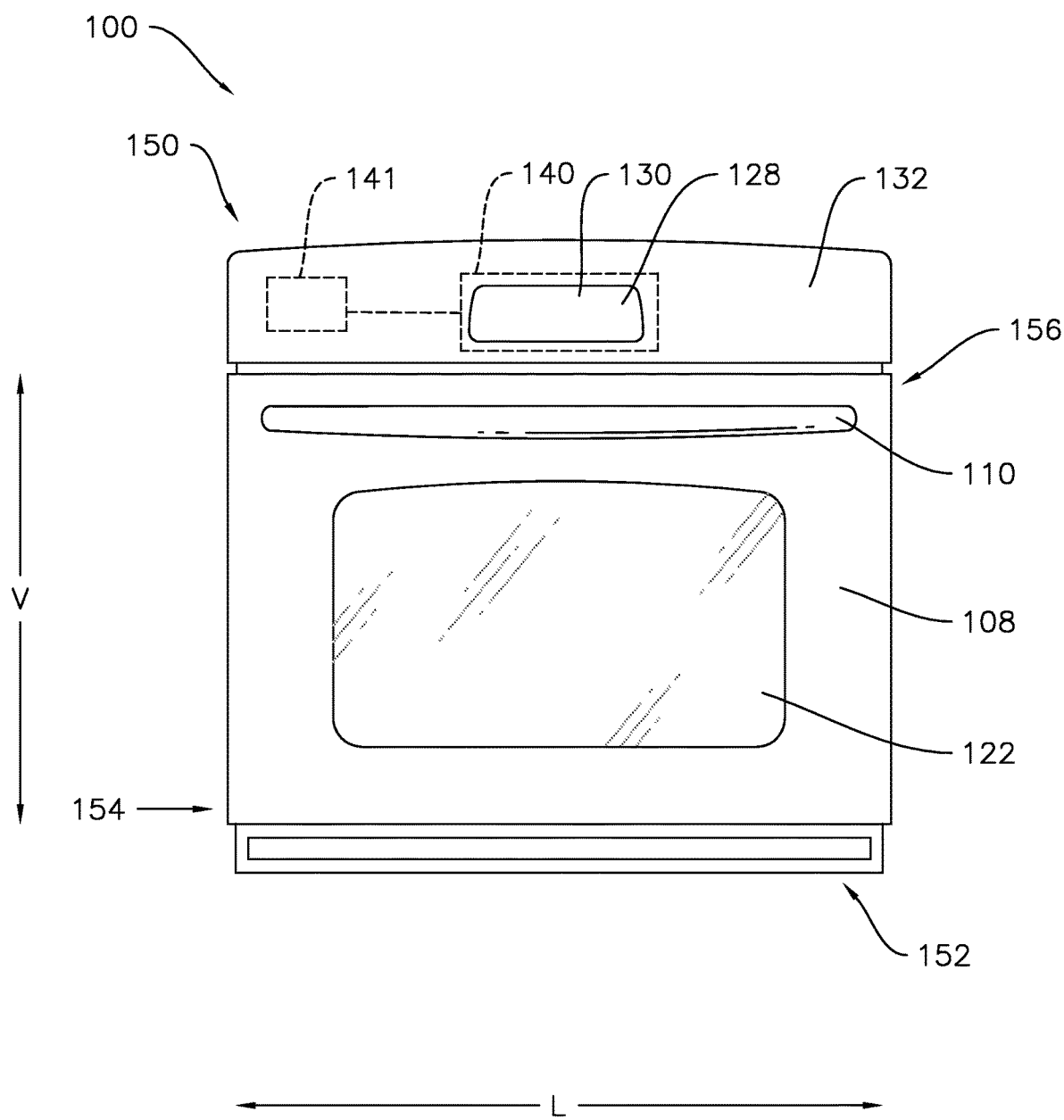
FIG. 1 provides a front view of an exemplary oven appliance according to one or more embodiments of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "generally," or "about" include values within ten percent greater or less than the stated value. In the context of an angle or direction, such terms include values within ten degrees greater or less than the stated direction. For example, "generally vertical" includes directions within ten degrees of vertical in any direction, e.g., clockwise or counter-clockwise.

The present disclosure is generally directed to an appliance 100 including a user interface 128 with a touchscreen display 130. The user interface 128 and the touchscreen display 130 thereof are in operative communication with a main controller 141 of the appliance 100 via a touchscreen controller 140. The touchscreen controller 140 communicates with the touchscreen 130 over an inter-integrated circuit (I2C) bus 200. The appliance 100 also includes a serial peripheral interface (SPI) monitor 202 for the inter-integrated circuit bus 200.

Figure 2:
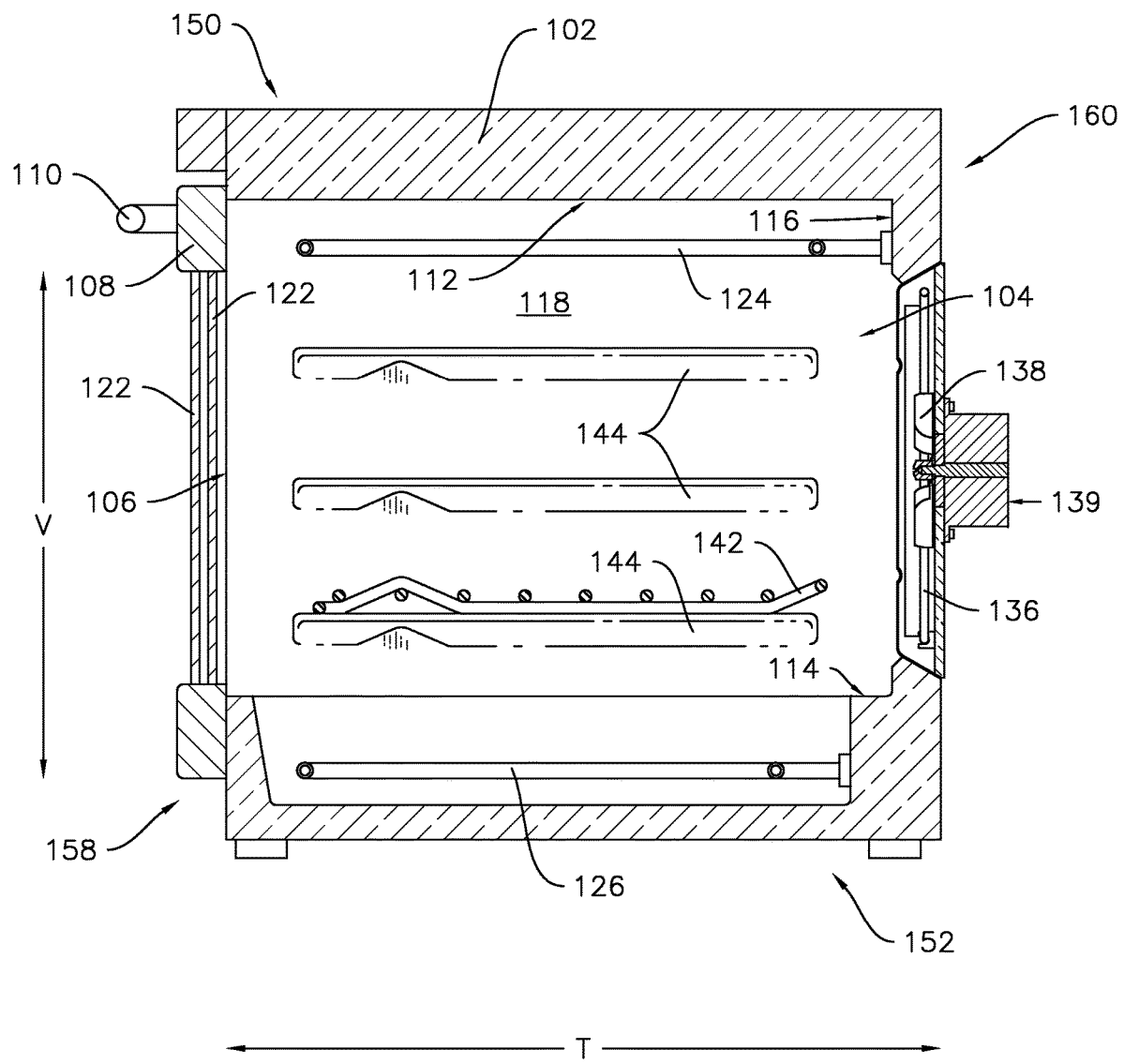
FIG. 2 is a cross-sectional view of the oven appliance of FIG. 1.

In some embodiments, e.g., as illustrated in FIGS. 1 and 2, the appliance 100 may be an oven appliance. FIGS. 1 and 2 illustrate an oven appliance 100 according to one or more exemplary embodiments of the present subject matter. Oven appliance 100 includes an insulated cabinet 102 which defines a vertical direction V, a lateral direction L, and a transverse direction T. The vertical, lateral, and transverse directions V, L, and T are mutually perpendicular and form an orthogonal direction system. Cabinet 102 extends between a top portion 150 and a bottom portion 152 along the vertical direction V. Cabinet 102 extends between a left side 154 and a right side 156 along the lateral direction L and between a front portion 158 and a back portion 160 along the transverse direction T.

Still referring to FIGS. 1 and 2, for this exemplary embodiment, oven appliance 100 includes an insulated cabinet 102 with an interior cooking chamber 104 defined by a top wall 112, a bottom wall 114, a back wall 116, and a pair of opposing side walls 118. Cooking chamber 104 is configured for the receipt of one or more food items to be cooked. Oven appliance 100 includes a door 108 pivotally mounted to cabinet 102 at the opening 106 of cabinet 102 to permit selective access to cooking chamber 104 through opening 106. A handle 110 is mounted to door 108 and assists a user with opening and closing door 108. For example, a user can pull on handle 110 to open or close door 108 and access cooking chamber 104.

Oven appliance 100 can include a seal (not shown) between door 108 and cabinet 102 that assists with maintaining heat and cooking vapors within cooking chamber 104 when door 108 is closed as shown in FIGS. 1 and 2. Multiple parallel glass panes 122 provide for viewing the contents of cooking chamber 104 when door 108 is closed and assist with insulating cooking chamber 104. A baking rack 142 is positioned in cooking chamber 104 for the receipt of food items or utensils containing food items. Baking rack 142 is slidably received onto embossed ribs or sliding rails 144 such that rack 142 may be conveniently moved into and out of cooking chamber 104 when door 108 is open.

One or more heating elements may be included in the cooking chamber 104, e.g., at the top, bottom, or both of cooking chamber 104, to provide heat to cooking chamber 104 for cooking. Such heating element(s) can be gas, electric, microwave, or a combination thereof. For example, in the embodiment shown in FIG. 2, oven appliance 100 includes a top heating element 124 and a bottom heating element 126, where bottom heating element 126 is positioned adjacent to and below bottom wall 114. Other configurations with or without wall 114 may be used as well.

In the illustrated example embodiment, oven appliance 100 also has a convection heating element 136 and convection fan 138 positioned adjacent back wall 116 of cooking chamber 104. Convection fan 138 is powered by a convection fan motor 139. Further, convection fan 138 can be a variable speed fan—meaning the speed of fan 138 may be controlled or set anywhere between and including, e.g., zero and one hundred percent (0%-100%). In certain embodiments, oven appliance 100 may also include a bidirectional triode thyristor (not shown), i.e., a triode for alternating current (TRIAC), to regulate the operation of convection fan 138 such that the speed of fan 138 may be adjusted during operation of oven appliance 100. The speed of convection fan 138 can be determined by controller 140. In some embodiments, the convection fan 138 may be configured to rotate in two directions, e.g., a first direction of rotation and a second direction of rotation opposing the first direction of rotation. For example, in some embodiments, reversing the direction of rotation, e.g., from the first direction to the second direction or vice versa, may still direct air from the back of the cavity. As another example, in some embodiments reversing the direction results in air being directed from the top and/or sides of the cavity rather than the back of the cavity. Additionally, the convection heating features are optional and are shown and described herein solely by way of example. In other embodiments the oven appliance 100 may include different convection heating features or may not include convection heating features at all.

In various embodiments, more than one convection heater, e.g., more than one convection heating elements 136 and/or convection fans 138, may be provided. In such embodiments, the number of convection fans and convection heaters may be the same or may differ, e.g., more than one convection heating element 136 may be associated with a single convection fan 138. Similarly, more than one top heating element 124 and/or more than one bottom heating element 126 may be provided in various combinations, e.g., one top heating element 124 with two or more bottom heating elements 126, two or more top heating elements 124 with no bottom heating element 126, etc.

Oven appliance 100 includes a user interface 128 having a display 130 positioned on an interface panel 132. The display 130 may be a touchscreen for receiving user input, such as commands, instructions, and/or settings for the oven appliance 100. User interface 128 thus allows the user to select various options for the operation of oven 100 including, e.g., various cooking and cleaning cycles. Operation of oven appliance 100 can be regulated by a main controller 141 that is operatively coupled to, i.e., in communication with, user interface 128, heating elements 124, 126, and other components of oven 100 as will be further described. In particular, the user interface 128 may include a touchscreen controller 140 which is directly connected to the main controller 141 between the touchscreen 130 and the main controller 141. The touchscreen controller 140 may register or detect user input by detecting or responding to a touch by a user on the touchscreen 130, such as by monitoring and responding to changes in capacitance when a user touches the touchscreen 130, as is generally understood by those of ordinary skill in the art.

For example, in response to user manipulation of the user interface 128 relayed via the touchscreen controller 140, the main controller 141 can operate the heating element(s). Controller 141 can receive measurements from one or more temperature sensors (not shown) which are in or in thermal communication with the cooking chamber 104. Controller 141 may also provide information such as a status indicator, e.g., a temperature indication, to the user with display 130. Controller 141 can also be provided with other features as will be further described herein.

Figure 3:
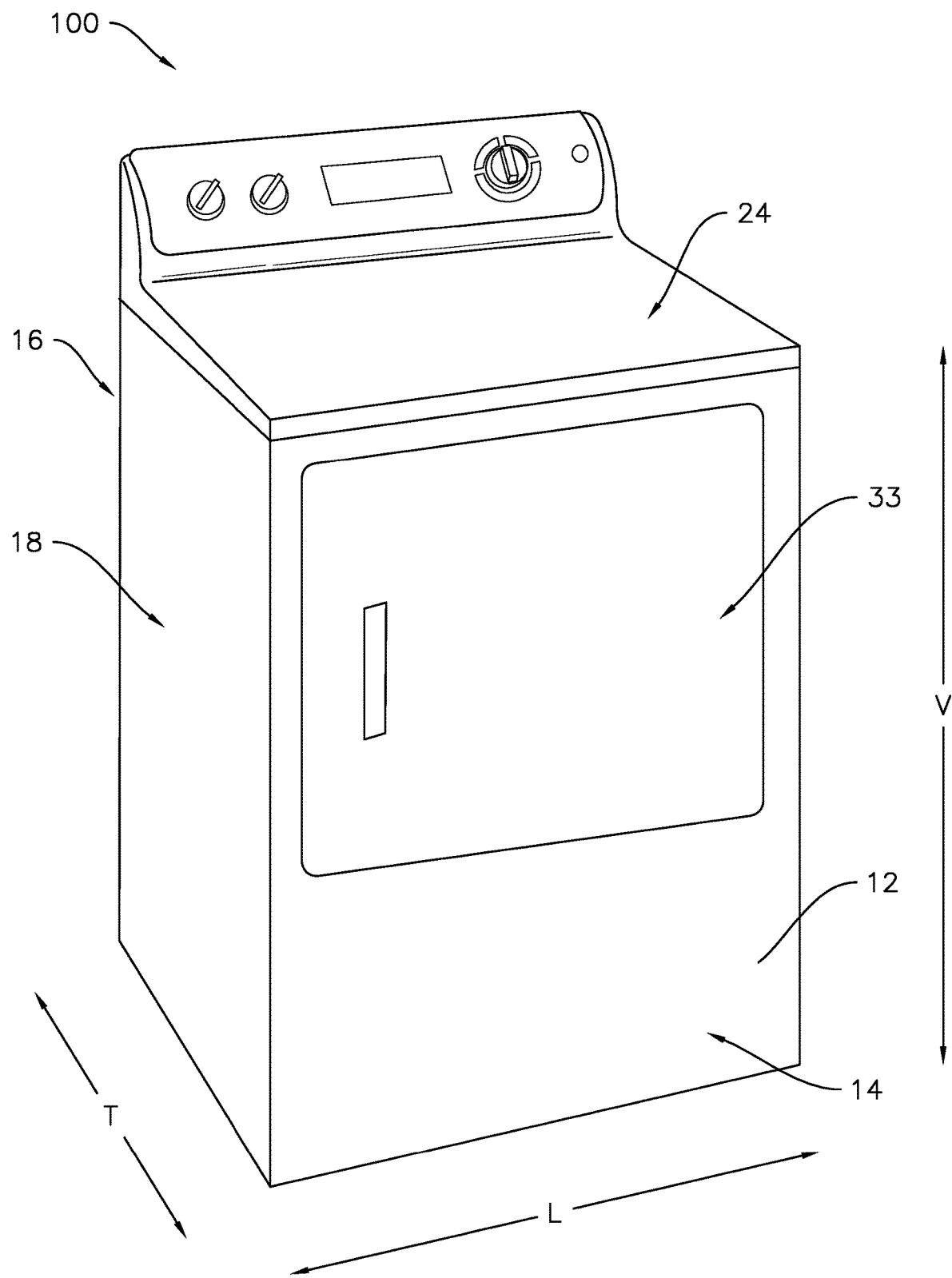
FIG. 3 provides a perspective view of a dryer appliance in accordance with exemplary embodiments of the present disclosure.
Figure 4:
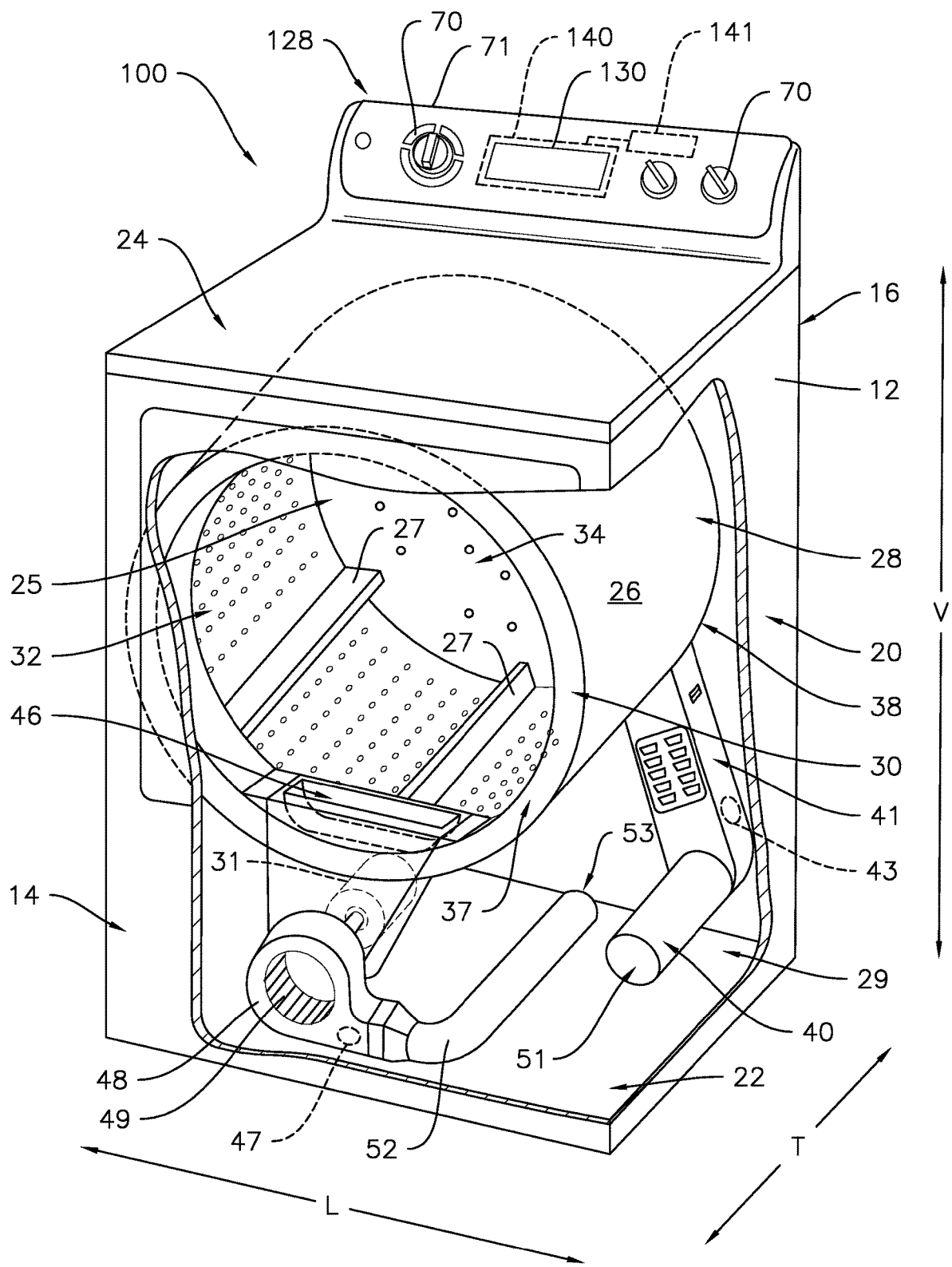
FIG. 4 provides a perspective view of the example dryer appliance of FIG. 1 with portions of a cabinet of the dryer appliance removed to reveal certain components of the dryer appliance.

The various controllers described herein, e.g., the touchscreen controller 140 and the main controller, Controller 141 may include a memory and one or more processing devices such as microprocessors, CPUs, or the like, such as general or special purpose microprocessors operable to execute programming instructions or micro-control code associated with operation of appliance 100, where the appliance 100 may be, e.g., in various embodiments, the oven appliance 100 as in FIGS. 1 and 2, or the dryer appliance 100 as in FIGS. 3 and 4, or other similar domestic appliance 100. The memory may represent random access memory such as DRAM or read only memory such as ROM or FLASH, or electrically erasable, programmable read only memory (EEPROM). In one embodiment, the processor executes programming instructions stored in memory. The memory may be a separate component from the processor or may be included onboard within the processor. The memory can store information accessible by the processor(s), including instructions that can be executed by processor(s). For example, the instructions can be software or any set of instructions that when executed by the processor(s), cause the processor(s) to perform operations. For the embodiment depicted, the instructions may include a software package configured to operate the system, e.g., to execute exemplary methods of operating the oven appliance 100 (or other domestic appliances in various embodiments). It should be noted that controllers as disclosed herein are capable of and may be operable to perform any methods and associated method steps as disclosed herein. For example, in some embodiments, methods disclosed herein may be embodied in programming instructions stored in the memory and executed by the controller or controllers.

Controller 141 may be positioned in a variety of locations throughout oven appliance 100. In the illustrated embodiment, controller 141 is located next to user interface 128 within interface panel 132. In other embodiments, controller 141 may be located under or next to the user interface 128, otherwise within interface panel 132, or at any other appropriate location with respect to oven appliance 100. Generally, the main controller 141 will be positioned within the cabinet 102. In the embodiment illustrated in FIG. 1, input/output ("I/O") signals are routed between the main controller 141 and various operational components of oven appliance 100 such as heating elements 124, 126, 136, convection fan 138, controls 134, display 130, camera 180 in the door 108, alarms, and/or other components as may be provided. In one embodiment, user interface 128 may represent a general purpose I/O ("GPIO") device or functional block.

While oven 100 is shown as a wall oven, the present invention could also be used with other cooking appliances such as, e.g., a stand-alone oven, an oven with a stove-top, or other configurations of such ovens. Numerous variations in the oven configuration are possible within the scope of the present subject matter. As an example, the oven appliance 100 may include multiple doors 108 instead of or in addition to the single door 108 illustrated. Such examples include a dual cavity oven, a French door oven, and others. As still another example, one or more of the illustrated electrical resistance heating elements may be substituted with gas burners or microwave heating elements, or any other suitable heating elements. The examples described herein are provided by way of illustration only and without limitation.

In additional embodiments, the appliance 100 may be a laundry appliance, such as the dryer appliance 100 illustrated in FIGS. 3 and 4.

FIG. 3 provides a perspective view of dryer appliance 100 according to one or more additional exemplary embodiments of the present disclosure. FIG. 4 provides another perspective view of dryer appliance 100 with a portion of a cabinet or housing 12 of dryer appliance 100 removed in order to show certain components of dryer appliance 100. Dryer appliance 100 generally defines a vertical direction V, a lateral direction L, and a transverse direction T, each of which is mutually perpendicular, such that an orthogonal coordinate system is defined. While described in the context of a specific embodiment of dryer appliance 100, using the teachings disclosed herein, it will be understood that dryer appliance 100 is provided by way of example only. Other dryer appliances having different appearances and different features may also be utilized with the present subject matter as well.

Cabinet 12 includes a front panel 14, a rear panel 16, a pair of side panels 18 and 20 spaced apart from each other by front and rear panels 14 and 16, a bottom panel 22, and a top cover 24. Within cabinet 12, an interior volume 29 is defined. A drum or container 26 is mounted for rotation about a substantially horizontal axis within the interior volume 29. Drum 26 defines a chamber 25 for receipt of articles of clothing for tumbling and/or drying. Drum 26 extends between a front portion 37 and a back portion 38. Drum 26 also includes a back or rear wall 34, e.g., at back portion 38 of drum 26. A supply duct 41 may be mounted to rear wall 34 and receives heated air that has been heated by a heating assembly or system 40.

As used herein, the terms "clothing" or "articles" includes but need not be limited to fabrics, textiles, garments, linens, papers, or other items from which the extraction of moisture is desirable. Furthermore, the term "load" or "laundry load" refers to the combination of clothing that may be washed together in a washing machine or dried together in a dryer appliance 100 (e.g., clothes dryer) and may include a mixture of different or similar articles of clothing of different or similar types and kinds of fabrics, textiles, garments and linens within a particular laundering process.

A motor 31 is provided in some embodiments to rotate drum 26 about the horizontal axis, e.g., via a pulley and a belt (not pictured). Drum 26 is generally cylindrical in shape, having an outer cylindrical wall 28 and a front flange or wall 30 that defines an opening 32 of drum 26, e.g., at front portion 37 of drum 26, for loading and unloading of articles into and out of chamber 25 of drum 26. A plurality of lifters or baffles 27 are provided within chamber 25 of drum 26 to lift articles therein and then allow such articles to tumble back to a bottom of drum 26 as drum 26 rotates. Baffles 27 may be mounted to drum 26 such that baffles 27 rotate with drum 26 during operation of dryer appliance 100.

Drum 26 includes a rear wall 34 rotatably supported within main housing 12 by a suitable fixed bearing. Rear wall 34 can be fixed or can be rotatable. Rear wall 34 may include, for instance, a plurality of holes that receive hot air that has been heated by a heating assembly or system 40, as will be described further below. Motor 31 is also in mechanical communication with an air handler 48 such that motor 31 rotates a fan 49, e.g., a centrifugal fan, of air handler 48. Air handler 48 is configured for drawing air through chamber 25 of drum 26, e.g., in order to dry articles located therein. In alternative example embodiments, dryer appliance 100 may include an additional motor (not shown) for rotating fan 49 of air handler 48 independently of drum 26.

Drum 26 is configured to receive heated air that has been heated by a heating assembly 40, e.g., via holes in the rear wall 34 as mentioned above, in order to dry damp articles disposed within chamber 25 of drum 26. For example, heating assembly 40 may include a heating element (not shown), such as a gas burner, an electrical resistance heating element, or heat pump, for heating air. As discussed above, during operation of dryer appliance 100, motor 31 rotates drum 26 and fan 49 of air handler 48 such that air handler 48 draws air through chamber 25 of drum 26 when motor 31 rotates fan 49. In particular, ambient air enters heating assembly 40 via an inlet 51 due to air handler 48 urging such ambient air into inlet 51. Such ambient air is heated within heating assembly 40 and exits heating assembly 40 as heated air. Air handler 48 draws such heated air through supply duct 41 to drum 26. The heated air enters drum 26 through a plurality of outlets of supply duct 41 positioned at rear wall 34 of drum 26.

Within chamber 25, the heated air may accumulate moisture, e.g., from damp clothing disposed within chamber 25. In turn, air handler 48 draws moisture-saturated air through a screen filter (not shown) which traps lint particles. Such moisture-statured air then enters an exit duct 46 and is passed through air handler 48 to an exhaust duct 52. From exhaust duct 52, such moisture-statured air passes out of dryer appliance 100 through a vent 53 defined by cabinet 12. After the clothing articles have been dried, they are removed from the drum 26 via opening 32. A door 33 (FIG. 3) provides for closing or accessing drum 26 through opening 32. The door 33 may be movable between an open position and a closed position, the open position for access to the chamber 25 defined in the drum 26, and the closed position for sealingly enclosing the chamber 25 defined in the drum 26.

In some embodiments, a user interface 128 including one or more selector inputs 70, such as knobs, buttons, touchscreen interfaces, etc., may be provided or mounted on the cabinet 12 (e.g., on a backsplash 71 of the cabinet 12) and in operable communication (e.g., electrically coupled) with a processing device or controller 141. A display 130 may also be provided on the backsplash 71 and may also be in operable communication with the controller 141, e.g., the display 130 may be or include a touchscreen for receiving user input and a touchscreen controller 140 for relaying such input to the controller 141, e.g., as described above with respect to the oven embodiments. Controller 141 may also be provided in operable communication with motor 31, air handler 48, and/or heating assembly 40. In turn, signals generated in controller 141 direct operation of motor 31, air handler 48, and/or heating assembly 40 in response to the user inputs or selections received, e.g., from the touchscreen display 130 via the touchscreen controller 140. In the example illustrated in FIG. 4, the user interface 128 also includes mechanical inputs 70, e.g., provided as knobs. In other embodiments, inputs 70 may also or instead include buttons, switches, touchpads and/or some or all of the user-operable controls may be incorporated in a touchscreen type interface on display 130.

The controllers 140 and 141 in the dryer appliance embodiment is generally the same as the controllers 140 and 141 described above in the context of the oven appliance embodiment. In embodiments where the appliance 100 is a dryer appliance, e.g., as in the example embodiments illustrated in FIGS. 3 and 4, the controllers may be programmed to operate dryer appliance 100 by executing instructions stored in the memory (e.g., non-transitory media), where embodiments of the memory associated with the dryer appliance 100 embodiment include each example described above with respect to the controller embodiments for the oven appliance 100 embodiments.

In some exemplary embodiments, the dryer appliance 100 may include one or more temperature sensors, such as inlet temperature sensor 43 and/or outlet temperature sensor 47. The temperature sensor(s) may be in operative communication with the controller 141. For example, in various embodiments, the controller 141 may be operable to detect, measure, and/or monitor one or more temperatures within the dryer appliance 100. Such temperatures which may be detected, measured, and/or monitored include, for example, an inlet temperature measured with the inlet temperature sensor 43 and/or an outlet temperature measured with the outlet temperature sensor 47. The temperature sensors 43 and 47 may be, in some embodiments, thermistors.

In various embodiments, the appliance 100 disclosed herein may be any domestic appliance with a user interface having an interlock, such as a domestic appliance which includes one or more heating elements or heaters of various types, e.g., an oven appliance or a clothes dryer appliance. The interlock may be configured to prevent unintended activation of the heating element. For example, the interlock may ensure that only valid user input on a touchscreen of the appliance is relayed to the heating element (e.g., by a touchscreen controller and/or via a main controller of the appliance) to activate or modify operation of the heating element. Additionally, it should be noted that references to "domestic" appliances herein are not intended to exclude, e.g., dryers in a laundromat, apartment building, hotel, dormitory, etc., or oven appliances in a commercial kitchen or other commercial/industrial setting.

Figure 5:
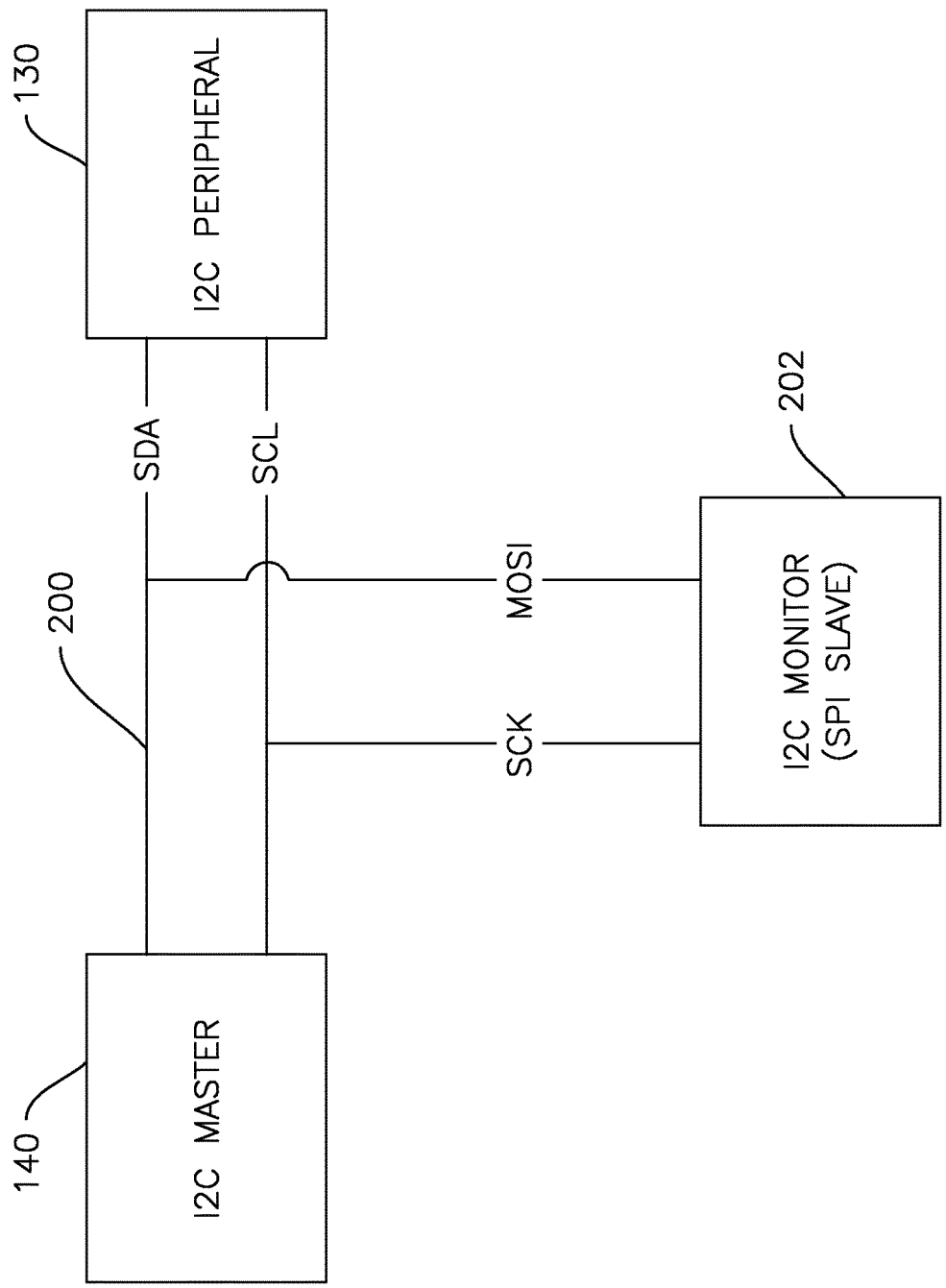
FIG. 5 provides a diagram illustrating controls of a domestic appliance according to one or more embodiments of the present subject matter.

FIG. 5 illustrates an exemplary control system or portion thereof for a domestic appliance according to one or more embodiments of the present disclosure. As illustrated in FIG. 5, the appliance controls include an inter-integrated circuit (I2C) master, e.g., the controller 140 as in the above-described embodiments, and an I2C peripheral, e.g., the touchscreen 130 and an associated controller or board thereof as in the above-described embodiments, where the I2C master 140 and the I2C peripheral 130 are in communication via an I2C bus 200. Also as may be seen, e.g., in FIG. 5, the exemplary appliance controls also include a serial peripheral interface (SPI) monitor 202 which is also in communication with the I2C bus 200. For example, in some embodiments, the SPI monitor may be in communication with the I2C bus 200 by connecting the SCK (serial clock) pin of the SPI monitor 202 to the SCL (clock) pin and by connecting the MOSI (master out slave in) pin of the SPI monitor 202 to the SDA (data) pin. Such connection allows the SPI monitor 202 to receive a synchronous bitstream between the I2C devices 130 and 140 in a byte-quantized fashion, e.g., one byte (eight bits) at a time, via the MOSI input of the SPI monitor 202. Thus, the SPI monitor 202 may be in operative communication with the inter-integrated circuit bus 200. As a result of such communication, the SPI monitor 202 may be operable to and configured to receive and monitor communication between the I2C peripheral (e.g., user interface 128 and/or touchscreen 130 thereof) and the controller (e.g., controller 140). In some embodiments, e.g., where the domestic appliance 100 includes an interlock or lock-out feature on the controls, such as on the touchscreen 130, to avoid unintentional activation of the domestic appliance 100, the SPI monitor 202 may be operable to and configured to verify that the domestic appliance 100 is operating as intended, e.g., that the domestic appliance 100 has not been inadvertently activated due to a false touch or unauthorized input on the user interface 128, and in particular the touchscreen 130 thereof.

Figure 6:
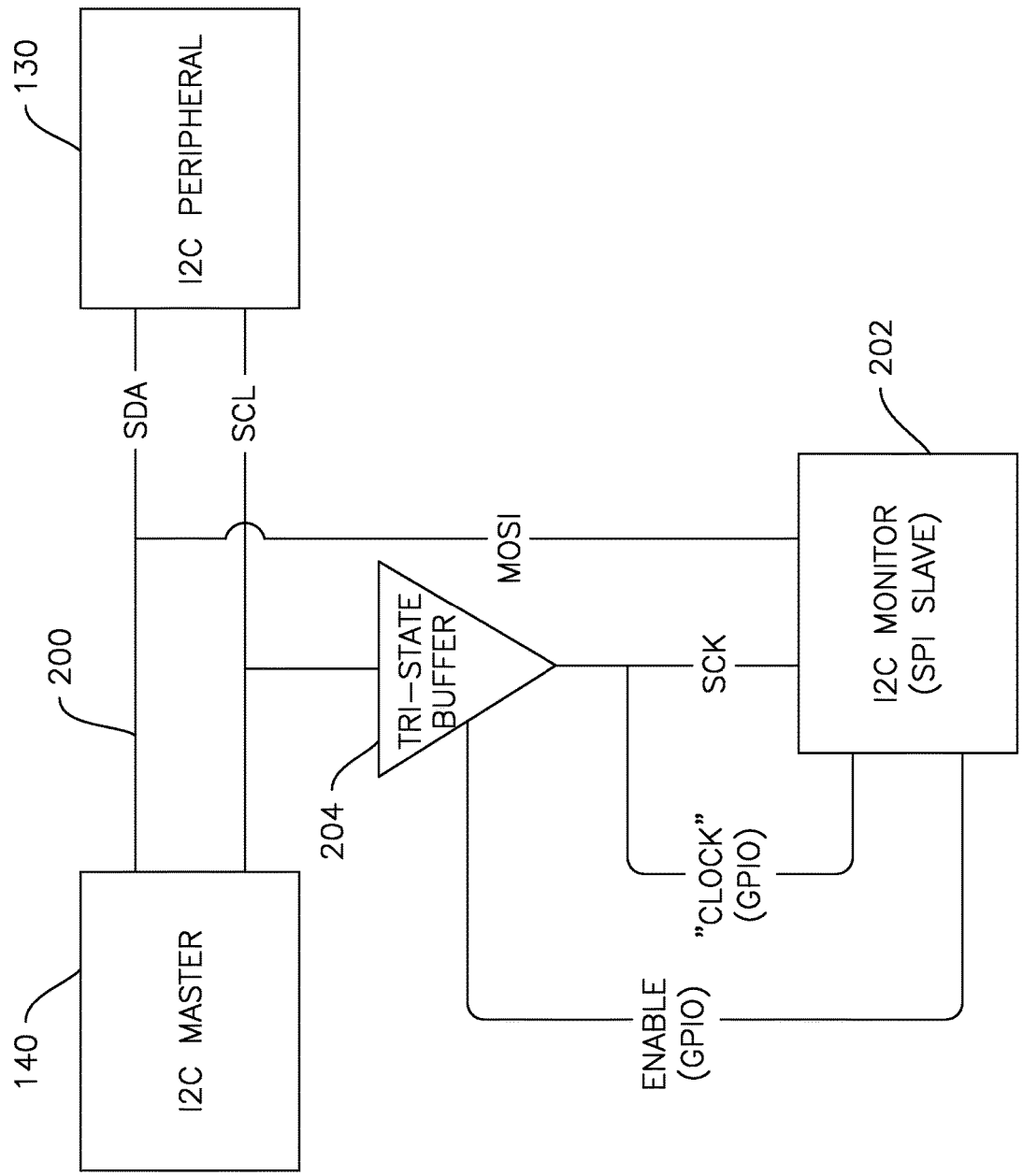
FIG. 6 provides a diagram illustrating controls of a domestic appliance according to one or more additional embodiments of the present subject matter.

In some embodiments, the control system or portion thereof for a domestic appliance may also include a tri-state buffer 204, e.g., as illustrated in FIG. 6. In such embodiments, the tri-state buffer 204 may be in communication with the SPI monitor 202. The tri-state buffer 204 may be operable to and configured to transmit a fake "clock" signal to the SPI monitor 202, which will result in termination of any in-progress SPI bytes, e.g., SPI bytes for which alignment and validation, as described in more detail below, have not been completed. The tri-state buffer 204 and the "clock" signal may advantageously be employed after a transaction has been determined to have been completed, e.g., by means of a timer, to terminate the in-progress SPI bytes (if any) in order to reduce or minimize latency. For example, at the end of a transaction, the tri-state buffer 204 may be disabled and the fake "clock" line may be configured as an output to generate "clock" edges until reception of an SPI byte. Once the byte has been received, the fake "clock" line may be configured as an input and the tri-state buffer 204 may be re-enabled.

In order for the SPI monitor 204 to monitor the synchronous bitstream travelling over the I2C bus 200, differences between I2C bitstreams and SPI bitstreams must be accounted for. Although both I2C and SPI are byte-oriented protocols, the I2C bitstream will also include signaling bits, such as bits used to signal acknowledge/negative acknowledge (ACK/NACK) and/or start/stop conditions. Therefore, a byte sent via the I2C bus 200 will be received as nine or ten bits by the SPI monitor 202 due to the presence of the signaling bits in addition to the eight bits of the I2C byte. Thus, the received SPI bitstream needs to be aligned to the I2C stream before traffic can be reconstructed.

In some embodiments, I2C transactions may be initially identified based on known timing characteristics. In such embodiments, identification of I2C transactions based on known timing characteristics may be performed by measuring the delay between bytes. For example, such known timing characteristics may include a known frequency of queries from the I2C master 140 to the I2C peripheral 130. In embodiments where the I2C master is the touchscreen controller 140 of the domestic appliance 100 and the I2C peripheral is the touchscreen 130 of the user interface 128 of the domestic appliance 100, the touchscreen controller 140 may scan for a touch on the touchscreen 130 with a known time interval between queries or a known scanning frequency. When the measured delay is large enough, e.g., is greater than a predetermined minimum threshold, the SPI bitstream, which is byte quantized, may be captured for processing and capture of the SPI bitstream for the next transaction may be started.

In some instances, there may be overlap between the SPI bitstreams of two adjacent transactions because a transaction is not guaranteed to have byte-divisible size and because a SPI bitstream is not guaranteed to be aligned with the beginning of a transaction.

In order to align the captured SPI bitstream, an offset is applied to the SPI bitstream. The offset may be between zero bits and seven bits. Applying each potentially valid offset, which in some embodiments may encompass the entire range from zero to seven (including zero and seven, integers only), an I2C byte stream is created from the captured SPI bitstream and compared against known transaction data. Such comparison may include validating the applied offset, e.g., determining that the offset is valid when the recreated I2C byte stream matches the known characteristics of the I2C byte stream, e.g., the known transaction data, and/or determining that the offset is invalid when the recreated I2C byte stream does not match the known transaction data. For example, the known transaction data may include one or more of an I2C device address, a memory location or a command that indicates the type of data, a register address, etc.

The I2C byte stream is created from the captured SPI bitstream by extracting the individual bits, skipping the signaling bits, and recreating the I2C bytes from the remaining bits. The signaling bits to skip are identified based on the applied offset. For example, where the applied offset is zero bits, an I2C byte will be created from the first through eighth bits and the subsequent bits will be skipped, where the applied offset is one bit, the first bit will be skipped and an I2C byte will be recreated using bits two through nine, etc. Once all offsets, e.g., zero through seven, have been applied and the resulting byte streams compared to the known transaction data, if one and only one offset into the bitstream matches the known characteristics of the I2C byte streams (that is, there is only one valid offset such that the match is unambiguous) then the transaction has been identified and unknown/variable data can be extracted.

Turning now to FIG. 7, in some embodiments, an optional fingerprinting check may be employed. For example, the fingerprint check may narrow down the number of potentially valid offsets to apply and validate. As illustrated in FIG. 7, the fingerprint check may include comparing the SPI bitstream against only certain bits in the I2C bitstream, such as signaling bits, e.g., ACK and NACK bits, at known locations in the I2C bitstream. For example, FIG. 7 illustrates a comparison of the SPI bitstream against every ninth bit, which is a known location in the I2C bitstream for a signaling bit because every byte in the I2C bitstream is followed by an ACK/NACK bit. Thus, the first through eighth bits in the I2C bitstream are skipped (as indicated by X's in FIG. 7) to create the fingerprint. In the example illustrated in FIG. 7, the offset of zero is invalid, as the ninth bit in the SPI bitstream does not match the fingerprint, e.g., does not match the ninth bit in the I2C bitstream (although the eighteenth bit does match, any discrepancy indicates the offset is invalid and further testing of that offset may be avoided). Thus, the first through eighth bits in the SPI bitstream do not correspond to a byte of date in the I2C bitstream, and the steps of creating an I2C byte stream from the captured SPI bitstream and comparing it against known transaction data using the offset of zero can be omitted in the example illustrated by FIG. 7.

Embodiments of the present disclosure also include methods of monitoring an inter-integrated circuit bus, such as an inter-integrated bus in a domestic appliance. For example, the domestic appliance usable in such methods may be the domestic appliance 100 as described above, embodiments of which include, but are not limited to, an oven appliance such as the exemplary oven appliance 100 of FIGS. 1 and 2, a dryer appliance such as the exemplary dryer appliance 100 illustrated in FIGS. 3 and 4, or other similar appliances.

Figure 8:
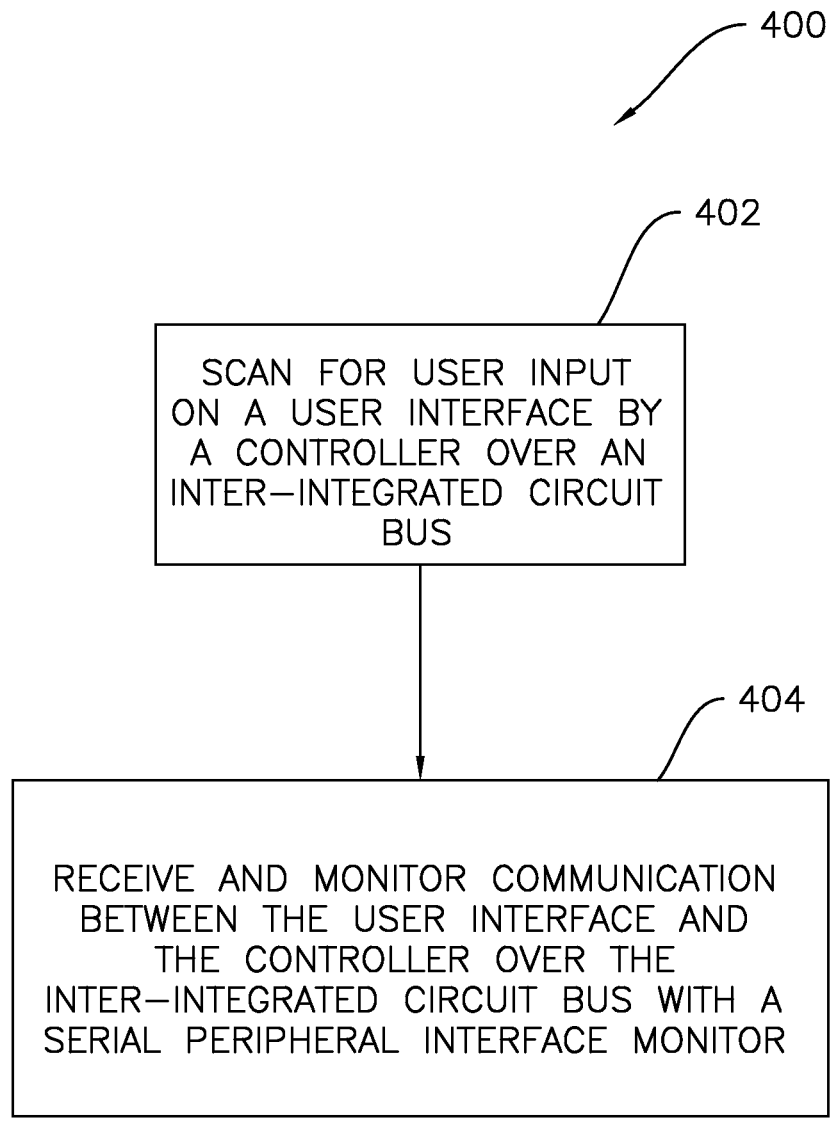
FIG. 8 provides a flowchart illustrating a method of monitoring data traffic on an I2C bus with an SPI monitor according to one or more embodiments of the present subject matter.

One example embodiment of such methods is the method 400 illustrated in FIG. 8. As illustrated in FIG. 8, the method 400 may include scanning, by a controller which is part of the appliance, e.g., the touchscreen controller 140 described above, for user input on a user interface. Such scanning may include querying a touchscreen at a known time interval, as described above. The touchscreen controller may be in communication with the user interface via an I2C bus, such that the step 402 of scanning includes scanning over the I2C bus. The method 400 may further include, e.g., as illustrated at 404 in FIG. 8, receiving and monitoring the communication between the user interface and the touchscreen controller via the I2C bus with a serial peripheral interface monitor.

Figure 9:
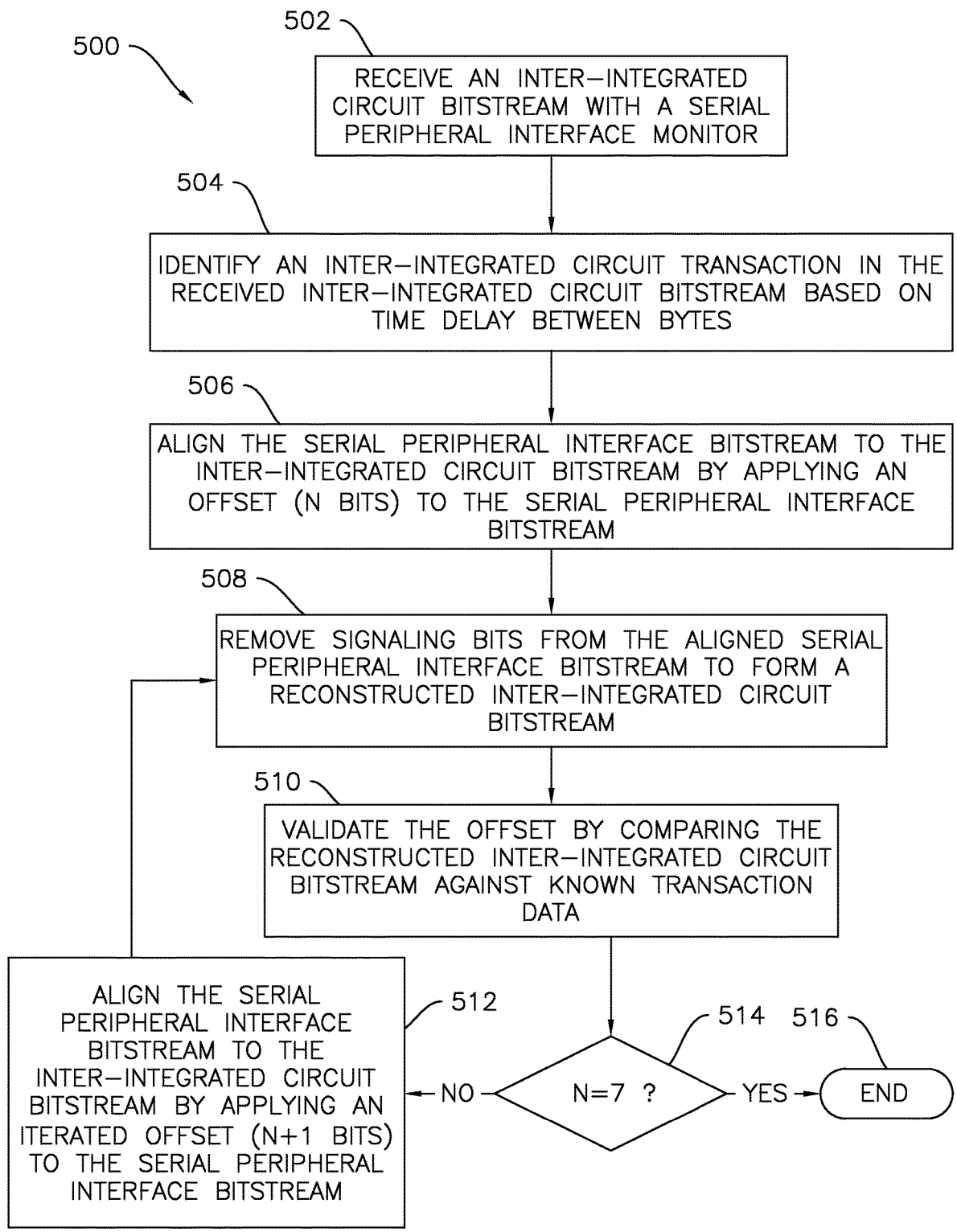
FIG. 9 provides a flowchart illustrating a method of capturing and aligning an I2C bitstream with an SPI monitor according to one or more embodiments of the present subject matter.

Another example method according to one or more embodiments of the present disclosure is illustrated in FIG. 9. Method 500 illustrated in FIG. 9 comprises the capture and alignment phases of the overall process of capturing, aligning, and interpreting the I2C bitstream with the SPI monitor. As shown in FIG. 9, the method 500 may include receiving an I2C bitstream with a SPI monitor, e.g., at step 502 in FIG. 9. The SPI monitor may be configured and operable to align and interpret the I2C bitstream, e.g., according to the methods disclosed herein such as method 500. For example, the method 500 may further include a step 504 of identifying an I2C transaction in the received I2C bitstream based on a known time delay between bytes of the I2C stream, such as the known query frequency between the I2C master and I2C peripheral described above. Method 500 may further include a step 506 of aligning the SPI bitstream to the I2C bitstream by applying an offset to the SPI bitstream. The offset may be N bits, where N may be, as mentioned above, zero through seven, inclusive, integers only. The method 500 may then include reconstructing the I2C bitstream with the SPI monitor. For example, as indicated at step 508 in FIG. 9, the signaling bits of the I2C bitstream may be skipped or removed and the remaining bits comprise a reconstructed I2C byte stream in the SPI monitor. The offset applied in step 506 may then be verified, e.g., validated, as indicated at step 510 in FIG. 9 by comparing certain reconstructed I2C bytes against known transaction data, e.g., the reconstructed I2C bytes which correspond in stream sequence with the known transaction data. As mentioned above, the known transaction data may be one or more of an I2C device address, a memory location or a command that indicates the type of data, a register address, etc. As generally described above, each possible offset, from zero to seven, inclusive, may be applied and validated in some embodiments. Thus, the initial N offset may be zero, and the method 500 may include a step 514 of determining whether N equals seven. When N is not equal to seven, e.g., when N is zero in the initial iteration of the method 500, the method 500 continues to step 512 of applying the next possible offset, e.g., N+1, such as an offset of one in the initial iteration of step 512. The aligned SPI bitstream using the iterated offset may then be used as the basis for a reconstructed I2C bitstream, e.g., the method 500 may return to step 508 after step 512 and then validate the iterated offset by comparing the reconstructed I2C stream based thereon against known transaction data at step 510. In at least some embodiments, the method 500 may include testing all possible offsets, e.g., repeating steps 508, 510, and 512 until N equals seven, at which time the method 500 may end, e.g., as illustrated at 516 in FIG. 9. The results of the method 500 may then be used to interpret the I2C bitstream, e.g., to extract data therefrom. For example, when there is an unambiguous match between one of the reconstructed I2C bitstreams and the known transaction data, e.g., when one and only one offset is valid, then the transaction may be identified and unknown data may be extracted from the one and only one reconstructed I2C bitstream with the valid offset.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A domestic appliance, comprising:
a heating element;
a user interface for receiving user input;
a main controller in operative communication with the user interface via a touchscreen controller and in operative communication with the heating element, wherein the user interface is in operative communication with the heating element via the touchscreen controller and the main controller, and wherein the user interface is in operative communication with the touchscreen controller via an inter-integrated circuit bus; and
a serial peripheral interface monitor in operative communication with the inter-integrated circuit bus, whereby the serial peripheral interface monitor is configured to receive and monitor communication between the user interface and the touchscreen controller, wherein the received and monitored communication between the user interface and the touchscreen controller is a synchronous bitstream which is transmitted and received between the user interface and the touchscreen controller via the inter-integrated circuit bus, and wherein the serial peripheral interface monitor is configured to create an inter-integrated circuit byte stream by applying an offset to the synchronous bitstream and is configured to validate the created inter-integrated circuit byte stream by comparing data of the created inter-integrated circuit byte stream against known transaction data.

2. The domestic appliance of claim 1, wherein the serial peripheral interface monitor is further configured to, prior to creating the inter-integrated circuit byte stream, determine the offset based on a fingerprint of the synchronous bitstream.

3. The domestic appliance of claim 2, wherein the fingerprint comprises signaling bits at known locations in the synchronous bitstream.

4. The domestic appliance of claim 1, further comprising a tri-state buffer in operative communication with the serial peripheral interface monitor, the tri-state buffer configured to transmit a fake clock signal to the serial peripheral interface monitor after a transaction between the touchscreen controller and the user interface is detected to have been completed.

5. The domestic appliance of claim 1, wherein the user interface comprises a touchscreen directly connected to the touchscreen controller via the inter-integrated circuit bus.

6. The domestic appliance of claim 1, wherein the serial peripheral interface monitor comprises an interlock configured to prevent unintended activation of the heating element.

7. The domestic appliance of claim 1, wherein the domestic appliance is an oven appliance comprising a cabinet with a cooking chamber defined therein, wherein the heating element is positioned in or proximate to the cooking chamber within the cabinet and the heating element is in direct thermal communication with the cooking chamber for cooking items therein.

8. The domestic appliance of claim 1, wherein the domestic appliance is a dryer appliance comprising a cabinet with a drum rotatably mounted therein, wherein the heating element is upstream of the drum whereby heated air flows from the heating element to the drum for drying of articles within the drum.

9. A method of monitoring an inter-integrated circuit bus in a domestic appliance, the domestic appliance comprising a heating element, a user interface for receiving user input, a main controller in operative communication with the user interface via a touchscreen controller and in operative communication with the heating element, wherein the user interface is in operative communication with the heating element via the touchscreen controller and the main controller, and wherein the user interface is in operative communication with the touchscreen controller via the inter-integrated circuit bus, and a serial peripheral interface monitor in operative communication with the inter-integrated circuit bus, the method comprising:
  monitoring, by the touchscreen controller via the inter-integrated circuit bus, the user interface for user input;
  receiving and monitoring, by the serial peripheral interface monitor, communication between the user interface and the touchscreen controller, wherein the received and monitored communication between the user interface and the touchscreen controller is a synchronous bitstream which is transmitted and received between the user interface and the touchscreen controller via the inter-integrated circuit bus;
  creating an inter-integrated circuit byte stream by applying an offset to the synchronous bitstream; and
  determining the offset based on a fingerprint of the synchronous bitstream prior to creating the inter-integrated circuit byte stream.

10. The method of claim 9, further comprising validating the created inter-integrated circuit byte stream by comparing data of the created inter-integrated circuit byte stream against known transaction data.

11. The method of claim 9, wherein the fingerprint comprises signaling bits at known locations in the synchronous bitstream.

12. The method of claim 9, further comprising transmitting a fake clock signal to the serial peripheral interface monitor after a transaction between the touchscreen controller and the user interface is detected to have been completed.

13. The method of claim 9, wherein the user interface comprises a touchscreen directly connected to the touchscreen controller via the inter-integrated circuit bus.

14. The method of claim 9, wherein the serial peripheral interface monitor comprises an interlock configured to prevent unintended activation of the heating element.

15. A domestic appliance, comprising:
  a heating element;
  user interface for receiving user input;
  a main controller in operative communication with the user interface via a touchscreen controller and in operative communication with the heating element, wherein the user interface is in operative communication with the heating element via the touchscreen controller and the main controller, and wherein the user interface is in operative communication with the touchscreen controller via an inter-integrated circuit bus;
  a serial peripheral interface monitor in operative communication with the inter-integrated circuit bus, whereby the serial peripheral interface monitor is configured to receive and monitor communication between the user interface and the touchscreen controller; and
  a tri-state buffer in operative communication with the serial peripheral interface monitor, the tri-state buffer configured to transmit a fake clock signal to the serial peripheral interface monitor after a transaction between the touchscreen controller and the user interface is detected to have been completed.

16. The domestic appliance of claim 15, wherein the received and monitored communication between the user interface and the touchscreen controller is a synchronous bitstream which is transmitted and received between the user interface and the touchscreen controller via the inter-integrated circuit bus.

17. The domestic appliance of claim 16, wherein the serial peripheral interface monitor is further configured to create an inter-integrated circuit byte stream by applying an offset to the synchronous bitstream.

18. The domestic appliance of claim 17, wherein the serial peripheral interface monitor is further configured to validate the created inter-integrated circuit byte stream by comparing data of the created inter-integrated circuit byte stream against known transaction data.

19. The domestic appliance of claim 17, wherein the serial peripheral interface monitor is further configured to, prior to creating the inter-integrated circuit byte stream, determine the offset based on a fingerprint of the synchronous bitstream.

20. The domestic appliance of claim 19, wherein the fingerprint comprises signaling bits at known locations in the synchronous bitstream.

* * * * *